INVENTOR
EDWARD J. DOWGIALLO, JR.

BY Harry M. Saragovitz
Edward J. Kelly
Herbert Berl
Robert C. Lutke 3,487,291
CONSTANT POWER CONTROL OF A POWER SOURCE
Edward J. Dowgiallo, Jr., 5623 Helmont Drive,
Oxon Hill, Md. 20021
Filed Apr. 19, 1967, Ser. No. 632,112
Int. Cl. H02j 7/36
U.S. Cl. 323—15                1 Claim

ABSTRACT OF THE DISCLOSURE

A device for the constant power control of a direct current power source. The device can be used with fuel cell and fork lift applications and to charge and discharge batteries. Constant power control is accomplished by multiplying output voltage across a power source, such as a fuel cell, by a second voltage which is representative of current from the power source. This gives an output voltage that is proportional to power and is used as the input to bias an operational power supply. The output of the operational power supply is applied to the power source as the corrective voltage to maintain a constant power output of the power source.

---

The invention described herein may be manufactured and used by or for the Government of the United States of America for governmental purposes without the payment to me of any royalties thereon.

FIELD OF THE INVENTION

This invention is in the class for electrical systems wherein a single electrical source circuit is coupled to a single electrical load circuit and means are provided which control the magnitude of the current or voltage of said electrical source circuit. An auxiliary battery or counter electromotive force is provided to maintain a constant power level.

DESCRIPTION OF THE PRIOR ART

Prior to my invention, power source control has been accomplished principally by pulse width modulation techniques. Typically, the output power is obtained by using the source voltage to determine the power pulse width and the source current to determine the power pulse amplitude. The resulting pulses are then averaged to give a substantially constant power output. By comparison, the pulse width modulation techniques require elaborate circuitry to produce the pulses, to determine pulse sizes and for driver functions. Also, the response is slow by comparison to this invention and the prior devices are prone to spiking and ripple problems. Further, operating time is often less than one half of the time of inoperativeness due to overheating of the equipment which in operation.

In the elegance of the solution to the problems of the prior art, applicant has provided a power source control which gives an instantaneous correction signal without any of the problems of the prior art. Power changes in the power source are constantly sensed and are compensated for immediately to maintain the power source at a constant power output level. There is no down time from heating in normal operation.

SUMMARY

When it is desirable to maintain the output power of a power source at a constant level, the circuit of this invention provides such constant control. Across the power source, is connected a voltage sensing circuit. A current sensing element is also provided in a circuit which includes the power source, load, and power level maintenance means. The outputs of the voltage and current sensing elements are fed as inputs into a multiplier. The output of the multiplier is a voltage which is proportional to the power level of the power source. This voltage is compared to a reference power voltage and any change in the power level of the power source is corrected by the power level maintenance unit.

It is an object of this invention to provide a control means of the power output of a power source by a voltage that is representative of power changes in the output of such power source.

Another object of this invention is to eliminate the inherent problems of the prior art.

The exact nature of this invention as well as other objects and advantages thereof will be readily apparent from consideration of the following specification relating to the annexed drawing.

BRIEF DESCRIPTION OF THE DRAWING

Turning now to the drawings, FIGURE 1 shows in block diagram, the circuit of this invention. The controlled element, 10, can be an active source of power such as a fuel cell. Connector means 21 connects controlled element 10 to an on-off switch 11 and a second connector means 22 connects the switch 11 to a current sensor 12. Current sensor 12, typically a shunt, has an output voltage $V_I$ which is fed by connector means 17 to input 40 of a multiplier 13. Voltage, $V_V$, across the controlled element 10 is fed by connector means 16 to a second input 39 of the multiplier 13. The two inputs to the multiplier 13 are multiplied thereby to produce an output voltage $V_p$ that is proportional to the product of $V_I$ times $V_V$. This output is coupled through connector 18 to a power level control means 14. Typically, power level control means 14 is a variable resistor by which the desired power level is set. The output of control means 14 is connected through connector 19 to a power level maintenance means 15 which maintains the output of controlled element 10 at a constant power level. This control is accomplished by the output voltage of the power level maintenance means 15 being changed in series with the power output of controller element 10 as to maintain the power level of the controlled element 10 at a constant level.

DESCRIPTION OF A PREFERRED EMBODIMENT

Figure 1:
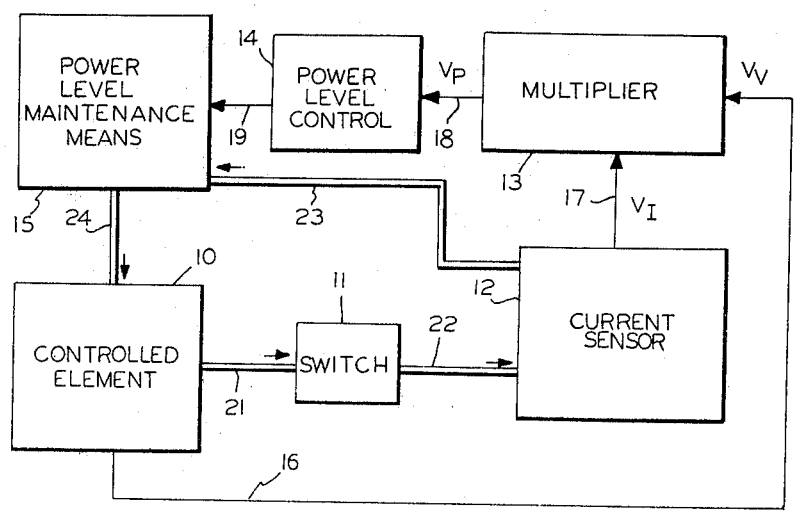
FIGURE 1 shows a block diagram of the circuit of this invention.
Figure 2:
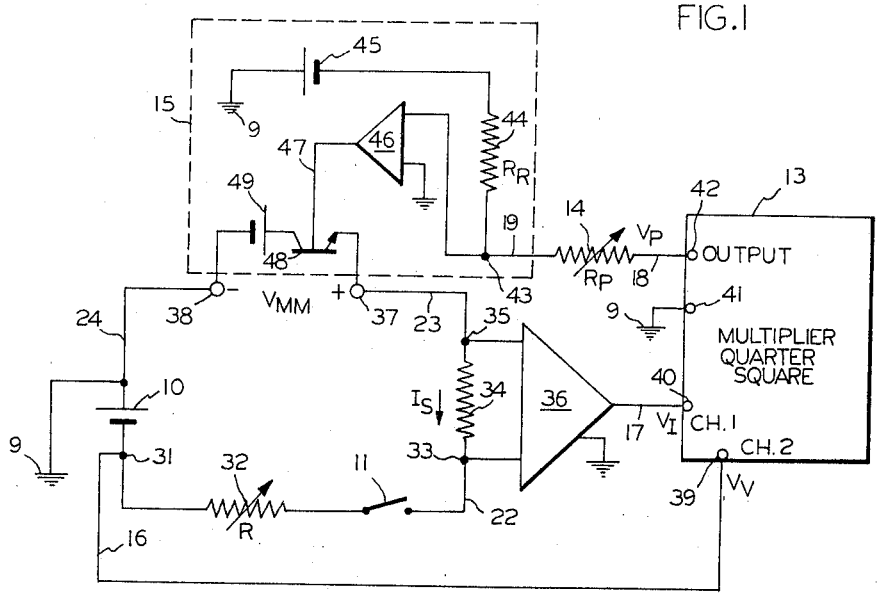
FIGURE 2 shows in schematic form the circuit of this invention.

In FIGURE 2 the power of a battery 10 is maintained at a constant level during discharge, an application found in testing of batteries and fuel cells, in operation of machinery or equipment that is battery powered, and the like. The negative terminal of battery 10 is connected to a load resistor 32 which, in consideration of the otherwise near zero effective impedance in the high current loop, serves to prevent reverse polarity conditions across terminals 37 and 38 of a power supply 15 which is the power level maintenance means of this figure. An on-off switch 11 is shown connected between load resistor 32 and a terminal 33. A second terminal 35 forms with terminal 33 the input terminals for an amplifier 36. Across terminals 33 and 35 is a shunt resistor 34. The voltage drop across terminals 33 and 35 is proportional to the current changes in the output of the controlled battery 10. A power supply 15 for maintaining the power level of battery 10 is connected in series with the battery 10, load resistor 32, switch 11, shunt 34 by a connector 23 between terminal 35 and terminal 37 of power supply 15 and by a connector 24 to the positive side of battery 10 and terminal 38 of the power supply 15. The positive side of battery 10 is also connected to a common ground 9.

A multiplier, a quarter square multiplier 13 in this example, has for one of its inputs the voltage level $V_V$ at the negative side of battery 10 applied through junction 31, connector 16 and multiplier input terminal 39. The output $V_I$ of amplifier 36 applied through connector 17 and multiplier input terminal 40 is proportional to the discharge current from battery 10. Quarter square multiplier 13 provides a voltage output $V_p$ at output terminal 42 which is representative of $V_V$ times $V_I$ in accordance with the algebraic identity $$V_p = V_V V_I = \tfrac{1}{4}[(V_V+V_I)^2 - (V_V-V_I)^2]$$

Quarter square multipliers utilize a classical approach, the quarter square technique with recognized advantages of versatility, simplicity, accuracy, wide bandwidth and reliability. It will be appreciated, of course, that the elemental analog computer components of a quarter square multiplier are basic to general computer design and may be readily assembled or programmed, as desired. The Q3–MIP Multiplier-Divider available from Philbrick Research Inc., 127 Clarendon St., Boston, Mass. 02116, and described in the quarterly publication, The lightning Empiricist, volume 12, numbers 3–4, pages 4–5, July–October 1964, Philbrick Research Inc., Boston, Mass. is typical of the commercial assemblies available for quarter square multiplier-applications. While a quarter square multiplier has been examplarily disclosed as useful to this invention, it is understood that the invention is not restricted to assemblies incorporating this variety of analog computer and that any multiplier which produces a basic product function, $V_p = V_V$ times $V_I$, may be utilized.

Connector 18 is connected between output terminal 42 and a power level control variable resistor 14 which determines the level of power at which battery 10 is to be maintained. A series loop is formed consisting of: ground 9, the output voltage $V_p$ of the multiplier 13 taken at output 42, power level control resistor 14, a resistor 44 within the power supply 15, a reference voltage 45 and ground 9 to complete the loop. A constant voltage input differential amplifier 46 is connected at a junction 43 between resistors 14 and 44. This amplifier 46 maintains the voltage level at junction 43 at zero volts. This is accomplished by the output of amplifier 46 being applied through connector 47 to the base of transistor 48 to cause the impedance of transistor 48 to change sufficiently to change the output voltage of the power supply 15 until no error voltage exists at junction 43, that is, there is a zero voltage level at junction 43. The emitter of transistor 48 is connected to power supply output terminal 37 and the collector of transistor 48 is connected to the positive side of a battery 49, the negative side thereof connected to power supply output terminal 38. Zero voltage at junction 43 means that the voltage drop across variable resistor 14 is equal and opposite to $V_p$, the output voltage of multiplier 13. Voltage source 45 causes a constant current to flow through resistors 44, 14 and the multiplier output to ground 9. Once the value of resistor 14, $R_p$, is set, the constant current through it is maintained by the feedback control of the multiplier output voltage to hold the voltage difference across terminals 41 and 43 at zero volts. This is true of any setting of resistor 14. It is by this feedback control circuitry changing the supply 15 output voltage that the output power from the battery 10 is maintained at a constant level throughout its useful life.

Figure 3:
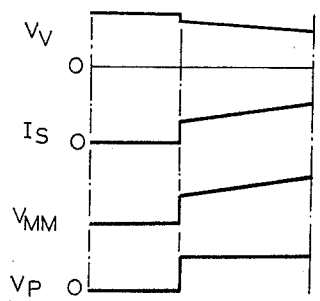
FIGURE 3 shows the waveforms of selected voltages before and after the circuit of this invention is energized.

The wave forms shown in FIGURE 3 show that the battery voltage $V_V$ starts to slope down when switch 11 is closed. To maintain a constant power output, $V_p$, the output of the power level maintenance means 15, $V_{MM}$, increases, the current through the battery, $I_S$ also increases with the result that the product of the battery voltage $V_V$ and battery current $I_S$ is constant. This, of course, means that the power output of battery 10 is maintained at a constant level.

In a particular embodiment, the voltage of the controlled element battery 10, having a typical low impedance, near zero, for example could be 2 volts, the voltage output of the power level maintenance means 15 could be 2 volts, load resistor 32 could be .05 ohm, the shunt current through shunt 34 is 80 amperes at 40 millivolts, the gain of amplifier 36 is 50 giving an output voltage of .04 times 50 equals 2 volts, $V_I$, applied to channel 1 of multiplier 13. $V_V$ is 2 volts as the battery. The output of the multiplier 13 is 4 volts, that is $V_p$ is 4 volts. Level control 14 is 645 ohms in this example. Resistor 44 in power supply 15 is 1000 ohms and the voltage source 45 is 6.2 volts. This will maintain a constant power level of 160 watts, that is, 80 amperes times 2 volts for battery 10 to give 160 watts.

So it is seen that I have provided an efficient constant power control for power source which operates constantly without downtime from overheating. This invention can find application as the constant power control of the direct current power source for the main drive unit and the lift drive unit in a fork lift. This invention gives infinite resolution of power and instantaneous control. It can be used to charge and to discharge batteries and is equally useful in fuel cell applications. Alternating current power sources can be controlled by this technique as well as the direct current examples set forth above.

I claim:
1. A controlled low voltage, high current, direct current power source having first and second output terminals and a selected internal impedance;
   input signal responsive power level maintenance means having first and second output terminals and at least one imput means, said power level maintenance means including a second direct current power source adapted to provide an output voltage of selected polarity across said first and second output terminals thereof in response to a selected input signal;
   means for connecting such output terminals of said low voltage, high current power source in opposing polarity relation, said means for connecting including series impedance means having a selected impedance relation with respect to said internal impedance of said low voltage, high current power source such that said series impedance prevents polarity reversal of the last said power source by said power level maintenance means;
   current sensing means adapted to sense the current level in the circuit interconnecting said low voltage, high current power source and said power level maintenance means, said current sensing means having a voltage output representative of the magnitude of the current level;

voltage multiplier means having first and second voltage input means and voltage output means adapted to provide a product function output voltage;

means connecting said second voltage input means of voltage multiplier to said low voltage, high current power source;

means connecting said second voltage input means of said voltage multiplier to the voltage output of said current sensing means; and means for connecting said voltage output means of said voltage multiplier means to input means of said power level maintenance means.

References Cited

UNITED STATES PATENTS

| | | |
|---|---|---|
| 3,176,215 | 3/1965 | Kusko. |
| 3,388,318 | 6/1968 | O'Brien _____ 323—20 |
| 3,391,322 | 7/1968 | Findley et al. _____ 323—20 X |

LEE T. HIX, Primary Examiner

A. D. PELLINEN, Assistant Examiner

U.S. Cl. X.R.

318—139; 320—32; 323—20